Figure 1:
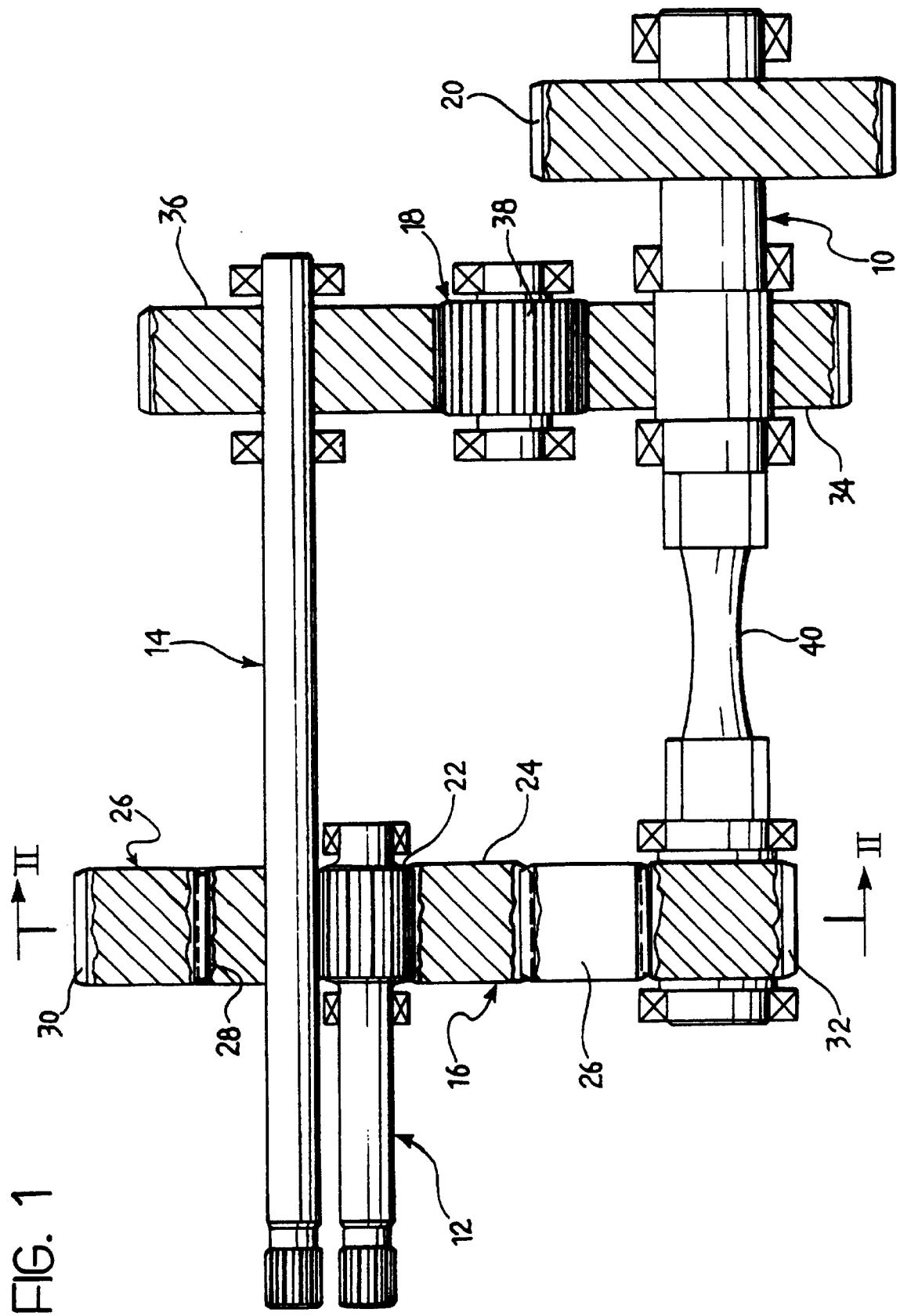

United States Patent

Maris

[11] Patent Number: 5,937,712
[45] Date of Patent: Aug. 17, 1999

[54] REDUCTION GEAR UNIT

[75] Inventor: Gianfranco Maris, Collegno, Italy

[73] Assignee: F.LLI Maris S.p.A., Rosta, Italy

[21] Appl. No.: 09/068,616

[22] PCT Filed: Nov. 5, 1996

[86] PCT No.: PCT/EP96/04809

§ 371 Date: Jul. 27, 1998

§ 102(e) Date: Jul. 27, 1998

[87] PCT Pub. No.: WO97/17185

PCT Pub. Date: May 15, 1997

[30] Foreign Application Priority Data

Aug. 11, 1995 [IT] Italy .................................. TO95A0904

[51] Int. Cl.[6] .............................................. B29C 47/08
[52] U.S. Cl. .................................................. 74/665 GA
[58] Field of Search .................. 74/665 GA, 665 G, 74/411; 475/332, 343

[56] References Cited

U.S. PATENT DOCUMENTS

| | | | |
|---|---|---|---|
| 4,253,345 | 3/1981 | Munster | 74/665 GA |
| 4,261,225 | 4/1981 | Zahradnik | 74/665 GA |
| 4,315,440 | 2/1982 | Chszaniecki | 74/665 GA |
| 4,586,219 | 5/1986 | Blach et al. | 74/410 |
| 4,586,402 | 5/1986 | Schafer | 74/801 |
| 4,899,620 | 2/1990 | Schiffer | 74/665 GA |
| 5,092,189 | 3/1992 | Bonalumi | 74/665 GA |
| 5,213,010 | 5/1993 | Hayafusa et al. | 74/665 GA |

FOREIGN PATENT DOCUMENTS

3600495A1  7/1987  Germany ..................... B29C 47/40

OTHER PUBLICATIONS

Patent Abstracts of Japan, vol. 13 No. 560 (M–906) Dec. 13, 1989.

*Primary Examiner*—Dirk Wright
*Attorney, Agent, or Firm*—Myers Bigel Sibley & Sajovec

[57] ABSTRACT

The reduction gear unit, particularly for use in twin-screw extruders comprises an input shaft (10), a first output shaft (12) and a second out put shaft (14) located parallel to and close to each other and associate with a respective worm screw, and a first gear train (16) and a second gear train (18) for connecting the input shaft (10) to the first output shaft (12) and to the second output shaft (14) respectively. The second output shaft (14) is long than the first output shaft (12) and is connected to the second gear train (18) by a part which is not alongside the first output shaft (12). Moreover, the input shaft (10) has a torsionally resilient portion (40) between its parts connected to the first gear train (16) and the second gear train (18) respectively.

8 Claims, 2 Drawing Sheets

REDUCTION GEAR UNIT

The present invention relates to a geared reduction unit particularly for use with extruders with two worm screws for thermoplastics materials.

In more detail, this reduction unit comprises:

an input shaft, a first output shaft and second output shaft located parallel to and close to each other and associated with a respective worm screw, and first and second gear trains for connecting the input shaft to the first and second output shafts respectively.

Reduction gears of this type must be made so as to enable the output shafts to transmit high torques which are the same as each other.

The arrangement of the two output shafts close together, however, makes it difficult to achieve this result since, for example, the diameter of the gears fixed to these shafts, which constitute the final component of the respective gear trains, must be limited. This dimensional limitation in turn limits the number of teeth or the value of the gear module of these gears which consequently limits the torque which can be transmitted.

The arrangement of the output shafts close together also imposes limits on the dimensions of their bearings which may thus be inadequate to withstand the high radial loads generated as a result of the use of gears with a small number of teeth.

JP-A-01 234 223 discloses a geared reduction unit of the type disclosed at the beginning of the present description, wherein the second output shaft is longer than the first output shaft and is connected to the second gear train by a part which is not alongside the first output shaft.

In order to optimize the performance of this kind of geared reduction unit, the subject of the present invention is a geared reduction unit of the type disclosed in claim 1.

The specific provision of a torsionally resilient portion in the input shaft has the advantage of making the torque transmitted to each output shaft the same, avoiding asymmetrical stresses. Therefore sizes and strength of the gear trains can be reduced with major savings.

At the same time, the different lengths of the two output shafts has the further advantage that the radial bulk of the component of the gear train located on the portion of output shaft not alongside the other output shaft is not subject to limitations which reduce the performance of the reduction unit.

Figure 2:
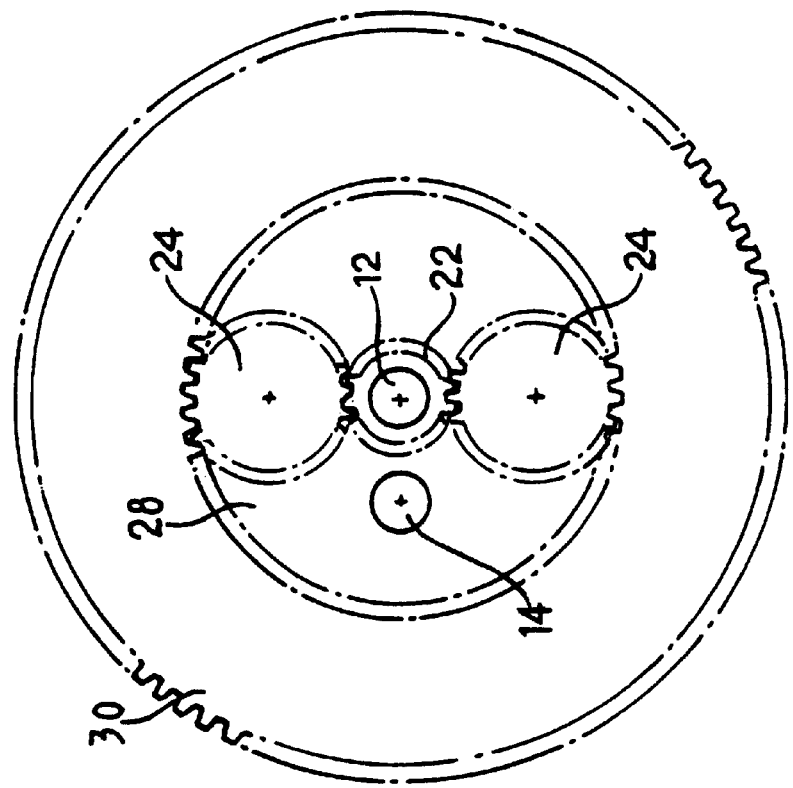
Figure 3:
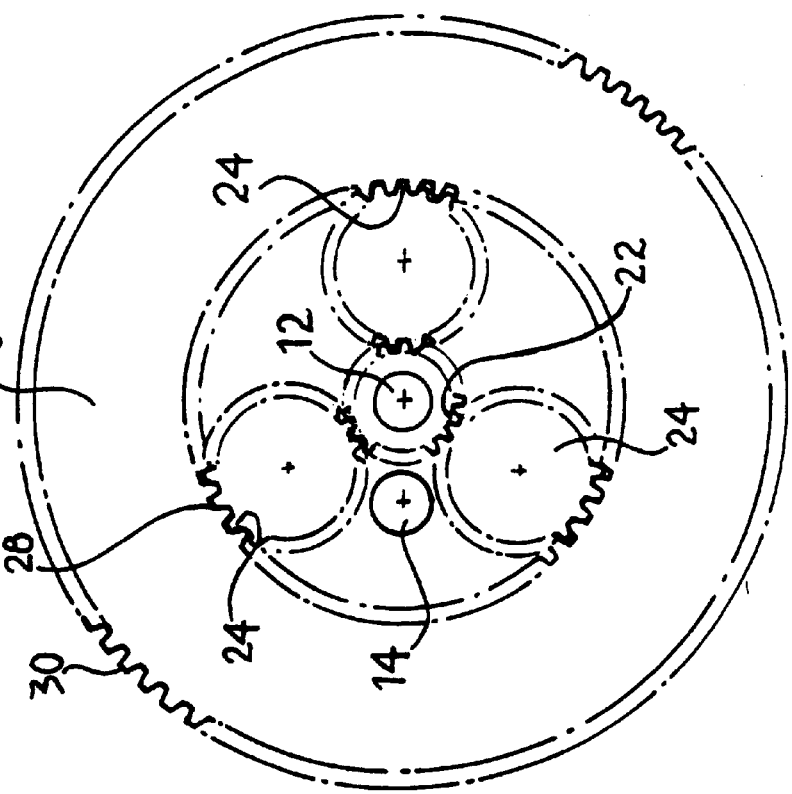

Further advantages and characteristics of the present invention will become clear from the detailed description which follows, given with reference to the appended drawing, provided purely by way of non-limitative example, in which:

FIG. 1 is a schematic plan view of a geared reduction unit according to the invention, FIG. 2 is a sectional view taken on the line II—II of FIG. 1, and FIG. 3 is a view corresponding to FIG. 2 showing an alternative embodiment of a reduction unit according a to the invention.

A geared reduction unit, particularly for use in twin-screw extruders for thermoplastics materials, comprises (FIGS. 1 and 2): an input shaft 10, first and second output shafts 12, 14, first and second gear trains 16, 18 for connecting the input shaft 10 to the first output shaft 12 and the second output shaft 14 respectively.

The output shafts 12, 14 are associated with a restive worm screw (not visible in the drawings) and are arranged parallel to and close to each other. The second output shaft 14 is longer than the first output shaft 12 and is connected to the second gear train 18 by a part which is not alongside the first output shaft 12.

To one end of the input shaft 10 is fixed (for example keyed or made integrally) a drive gear 20 which is connected in known manner, not illustrated in the drawings, to a motor for driving the reduction unit.

The first gear train 16 includes a first gear 22 fixed to the first output shaft 12, three second gears 24 in mesh with the first gear 22, a ring gear 26 with internal teeth 28 and external teeth 30 and a third gear 32 fixed to the input shaft 10.

The internal teeth 28 of the ring gear 26 mesh with the second gears 24 while the outer gear 30 meshes with the third gear 32.

The three second gears 24 are arranged symmetrically (see FIG. 2) around the first gear 22 in the same plane which is generally transverse the input shaft 10 and output shafts 12, 14. Alternatively only two (see FIG. 3) or four or more second gears 24 may be provided, always located symmetrically around the first gear 22 so as to provide compensation for the forces, with reduced stress on the supports and bearings.

The second gear train 18 includes a fourth gear 34 fixed to the input shaft 10 and a fifth gear 36 fixed to a part of the second output shaft 14 which is not alongside the first output shaft 12.

The fourth gear 34 and fifth gear 36 are interconnected by an idle gear 38 so that the two output shafts 12, 14 rotate in the same sense.

Alternatively it is possible to make the two output shafts 12, 14 rotate in opposite senses, for example by connecting the fourth and fifth gears 34, 36 together directly.

In each case there is a substantial amount of space available to enable the various components of the gear train 18 to be dimensioned appropriately.

The input shaft 10 also has a torsionally resilient portion 40 between the parts keyed to the third gear 32 and to the fourth gear 34, which constitute the initial components of the first gear train 16 and the second gear train 18 respectively. This makes the torque transmitted to the output shafts 12, 14 the same.

Preferably the two gear trains 16, 18 are adjusted to be in phase by appropriate adjustment processes—for example hydraulic—, known per se and not described in detail here, at the end of their assembly process in which they could be found to be out of phase due to tolerances, imperfections of assembly and the like.

All the components of the first and second gear trains 16, 18 may for example have helical teeth or alternatively the first gear 22, the second gears 24 and the internal teeth 28 of the ring gear 26 may be formed with straight teeth while the remaining components of the gear trains 16, 18 have helical teeth.

Naturally, the principle of the invention remaining the same, the constructional details and forms of embodiment may be varied widely with respect to those described and illustrated purely by way of example, without thereby departing from its scope.

I claim:

1. A geared reduction unit, particularly for twin-screw extruders, comprising:

an input shaft (10), a first output shaft (12) and a second output shaft (14) located parallel to and close to each other and a first gear train (16) and a second gear train (18) for connecting the input shaft (10) to the first output shaft (12) and the second output shaft (14) respectively, the second output shaft (14) being longer than the first output shaft (12) and being connected to the second gear train (18), said second output shaft (14) having an axis parallel to an axis of said first output shaft (12), the reduction unit being characterised in that the output shaft (10) has a torsionally resilient portion (40) between its parts connected to the first gear train (16) and the second gear train (18) respectively.

2. A reduction unit according to claim 1, characterised in that the first gear train (16) includes a first gear (22) fixed to the first output shaft (12), at least two second gears (24) for meshing with the first gear (22), a ring gear (26) with internal teeth (28) and external teeth (30), the internal teeth (28) being adapted to mesh with the second gears (24), and a third gear (32) fixed to the input shaft (10) for meshing with the outer teeth (30) of the ring gear (26).

3. A reduction unit according to claim 2, characterised in that it includes two, three or four second gears (24) located symmetrically around the first gear (22) in the same plane which is generally transverse the input shaft (10) and output shafts (12, 14).

4. A reduction unit according to any one of the preceding claims, characterised in that the second gear train (18) includes a fourth gear (34) fixed to the input shaft (10) and a fifth gear (36) fixed to a part of the second output shaft (14) which is not alongside the first output shaft (12).

5. A reduction unit according to claim 4, characterised in that the fourth gear (34) and the fifth gear (36) are interconnected directly.

6. A reduction unit according to claim 4, characterised in that all the components of the first gear train (16) and the second gear train (18) have helical teeth.

7. A reduction unit according to claim 1, characterised in the inner gear of the ring gear having straight teeth.

8. A reduction unit according to claim 4, characterised in that the fourth gear (34) and the fifth gear (36) are interconnected with the interposition of an idle gear (38).

* * * * *

UNITED STATES PATENT AND TRADEMARK OFFICE
CERTIFICATE OF CORRECTION

PATENT NO. : 5,937,712
DATED : August 17, 1999
INVENTOR(S) : Gianfranco Maris

It is certified that error appears in the above-identified patent and that said Letters Patent is hereby corrected as shown below:

[30] Foreign Application Priority Data
Please delete the priority date of "Aug. 11, 1995" and substitute -- November 8, 1995 -- therefor.

At column 4, line 13, please delete "helical".

Signed and Sealed this

Seventeenth Day of April, 2001

Attest:

NICHOLAS P. GODICI

Attesting Officer     Acting Director of the United States Patent and Trademark Office